(12) United States Patent
Derrick

(10) Patent No.: US 6,352,280 B1
(45) Date of Patent: Mar. 5, 2002

(54) STEERING WHEEL WITH INSERTED AIRBAG MODULE

(75) Inventor: John Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/601,763

(22) PCT Filed: Feb. 12, 1999

(86) PCT No.: PCT/EP99/00925

§ 371 Date: Aug. 7, 2000

§ 102(e) Date: Aug. 7, 2000

(87) PCT Pub. No.: WO99/41111

PCT Pub. Date: Aug. 19, 1999

(30) Foreign Application Priority Data

Feb. 13, 1998 (DE) .................................. 298 02 472 U

(51) Int. Cl.[7] .............................................. B60R 21/16
(52) U.S. Cl. .................................... 280/728.2; 280/731
(58) Field of Search ........................... 280/728.2, 731; 74/552

(56) References Cited

U.S. PATENT DOCUMENTS

| 5,267,486 A | * | 12/1993 | Niwa et al. | .................... | 74/552 |
| 5,310,218 A | * | 5/1994 | Miyoshi et al. | ............. | 280/777 |
| 5,593,178 A | | 1/1997 | Shiga et al. | | |
| 5,755,458 A | * | 5/1998 | Donovan | .................. | 280/728.2 |
| 5,787,762 A | * | 8/1998 | Sakurai et al. | ................. | 74/552 |
| 6,122,992 A | * | 9/2000 | Papandreou | .................. | 74/552 |
| 6,139,051 A | * | 10/2000 | Fujita | .......................... | 280/731 |

FOREIGN PATENT DOCUMENTS

| DE | 29602630 | 7/1996 |
| JP | 08318806 | 12/1996 |
| JP | 09183350 | 7/1997 |
| WO | 9815431 | 4/1998 |

* cited by examiner

*Primary Examiner*—Paul N. Dickson
*Assistant Examiner*—Deanna Draper
(74) *Attorney, Agent, or Firm*—Tarolli, Sundheim, Covell, Tummino & Szabo L.L.P.

(57) ABSTRACT

A steering wheel is proposed which includes a steering wheel skeleton consisting of a hub, spokes and a steering wheel rim, and an airbag module housed therein, which for actuation of the horn is displaceable against a return force parallel to the steering wheel axis. The steering wheel has at least two upwardly open fork-like support sites (2) having locating holes (3) extending approximately perpendicularly to the steering wheel axis. The fork-like support sites (2) are embodied in the steering wheel skeleton (1). Downwardly angled mounting shackles (7) have elongated holes (8) extending in the direction of the steering wheel axis are embodied on or attached to a generator support (5) of the airbag module (6) in a way corresponding with the support sites (2). The airbag module (6) is joined to the steering wheel skeleton (1) by retaining pins (4) inserted in the locating holes (3) and through the elongated holes (8).

5 Claims, 1 Drawing Sheet

STEERING WHEEL WITH INSERTED AIRBAG MODULE

Figure 2:
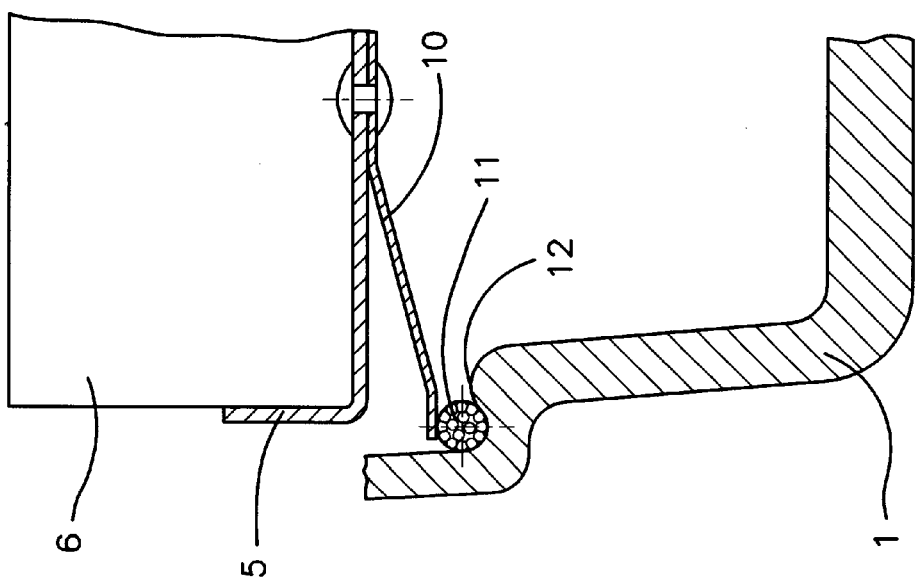

The invention relates to a steering wheel comprising a steering wheel skeleton consisting of a hub, spokes and a steering wheel rim, and an airbag module housed therein, which for actuation of the horn is arranged displaceably against a return force by the required contact path parallel to the steering wheel axis, at least two upwardly open fork-like support sites having locating holes extending approximately perpendicularly to the steering wheel axis being embodied in the steering wheel skeleton, downwardly angled mounting shackles having elongated holes extending in the direction of the steering wheel axis being embodied on or attached to a generator support of the airbag module in a way corresponding with the support sites, and the airbag module being joined to the steering wheel skeleton by means of retaining pins inserted in the locating holes and through the elongated holes. A steering wheel according to the preamble is known from JP-A-09/18 33 50.

Numerous proposals have already been made for attaching an airbag module within a steering wheel. If the steering wheels are attached by means of a nut screwed onto the thread end of the steering column during the final assembly, the airbag module cannot be inserted until the steering wheel has been assembled because it occupies the central region above the steering wheel hub which must remain freely accessible for screwing on the nut. If what is called integrated airbags shall be provided where the steering wheel is supplied together with the finally assembled airbag and mounted on the steering column, another steering wheel attachment must be supplied, for which proposals have also been made already. However, their handling creates more difficulty than that of the common steering wheel attachment which has a central nut and is tested a million times over.

With this version the airbag module cannot be installed—as stated already—until the steering wheel has been placed on the steering column and is attached thereto. For the attachment of the airbag module within the steering wheel, bolt connections must then be made available whose possible access cannot be provided on the top side of the steering wheel for optical reasons. The insertion of screws and the actuation of bolt connections from the rear side of the steering wheel are always difficult and time-consuming because of the spatial confinement. Since the automotive industry is striving for increasingly shorter final assembly times today, bolt connections and particularly those which have to be actuated from the rear side of the steering wheel, are considered extremely disadvantageous.

Therefore, it has also been tried already to attach airbag modules to the steering wheel by means of what is called snap-in or clip connections. However, it turned out that conventional connections of this kind are not suitable because they are not able to receive what is called the "ejection forces" occurring when an airbag is actuated or because these connections disengage as a result of the dynamic load. In the closed position, such connections are usually pretensioned to a certain degree, so that the snap-in or clip connection is secured and cannot disengage under standard conditions. However, when an airbag is inflated explosively, such connections are loaded within the meaning of an elimination of pretension, so that they can no longer reach reliably behind the snap-in protrusions when the directly following load occurs in the direction of pretension.

If the airbag cover shall be used for actuating the horn, the entire airbag module will have to be arranged displaceably by the required contact path within the steering wheel parallel to the steering wheel axis. For these uses, snap-in or latching connections are out of account because a permanent pretension of these connections is incompatible with the movability of the air bag required for closing the horn contacts in terms of design. Nevertheless, there is also a demand for reducing the time spent for installing the steering wheel and the airbag during the final assembly, if possible, and at the same time for reducing the space required for housing the airbag for such cases as well.

Therefore, the object is to provide a possibility according to which steering wheel and airbag module can be assembled finally as time-saving and space-saving as possible by retaining the common central attachment of the steering wheel to the steering column.

In order to achieve this object, it is proposed in connection with a steering wheel of the initially mentioned kind that sheet sections acting as leaf springs are arranged between the generator support and the steering wheel skeleton, which when in the assembled state support, at their end sides, on abutments at the steering wheel skeleton and pretension the airbag module against the horn actuation direction, plastics elements or a surrounding plastics ring being arranged between the sheet sections and the abutments and in the area of the fork-like support sites the retaining pins serve as an abutment for the plastics elements and the plastics ring, respectively.

With this proposal the steering-wheel can readily be placed on the steering column as usual and be bolted therewith before the airbag module is installed. The latter can be inserted in the pot-shaped steering wheel from above and be attached by retaining pins which can be inserted on the rear side of the steering wheel approximately perpendicularly to the steering wheel axis. The use of elongated holes enables the movability in the direction of the steering wheel axis, which is required for the actuation of the horn. For pretensioning the airbag module against the horn actuation direction, it is possible to return to known solutions.

Advantageous embodiments of the inventive concept are described in subclaims 2 to 5. Further particulars are explained in more detail by means of the embodiments shown in FIGS. 1 and 2.

Figure 1:
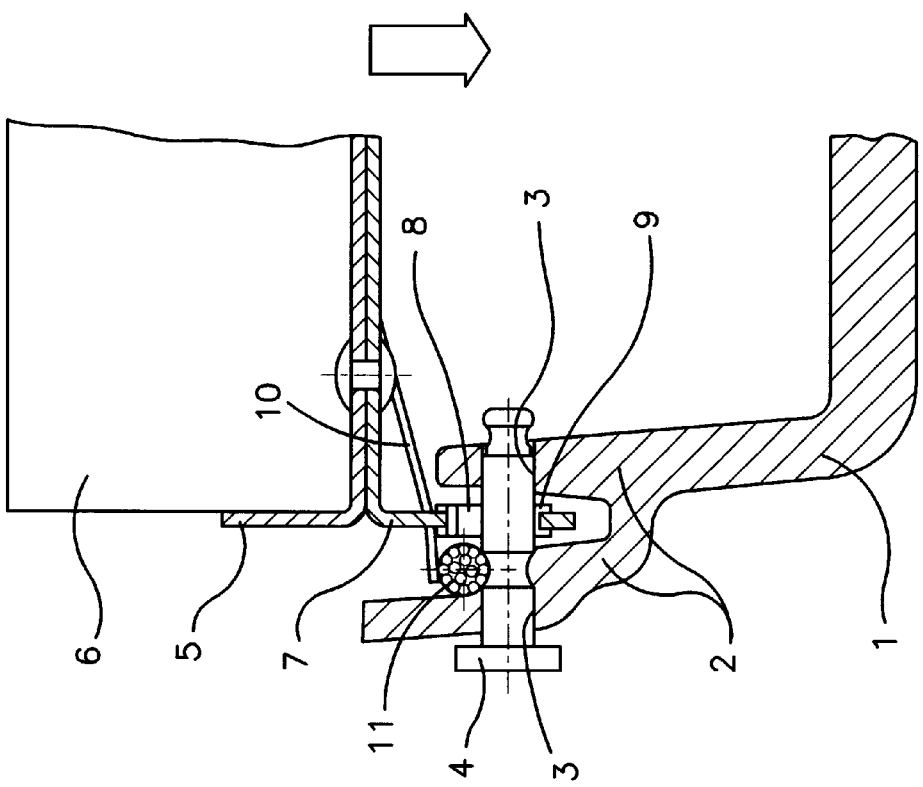

FIG. 1 shows a vertical partial section through a steering wheel skeleton in the area of the fixing points, and FIG. 2 shows a vertical partial section through the same steering wheel skeleton outside the fixing points.

The steering wheel skeleton 1 according to FIG. 1 is designed with at least two upwardly open fork-like support sites 2 which, with respect to the generator support 5 of the airbag module 6, are arranged such that they are distributed on the periphery. In the final assembly position shown, an angled mounting shackle 7 which is riveted to the generator support 5 engages the fork-like support site 2 where it is attached by means of the retaining pin 4 which extends through the locating holes 3 of the fork-like support site 2 and the elongated hole 8 of the mounting shackle 7. A plastics bush 9 is inserted in the elongated hole 8 to avoid direct contact between the mounting shackle 7 and the retaining pin 4. Furthermore, a sheet section 10 acting as a leaf spring is embodied on or attached to the generator support 5, which when in the assembled state supports, at its end side, on an abutment in the steering wheel skeleton. The sheet section 10 serves for building up a pretension against the horn actuation direction through which the retaining pin 4 is simultaneously held with a pretension in the locating holes 3.

It is evident from FIG. 2 how the abutment 12 can be designed at the steering wheel skeleton outside the fixing points. A plastics element 11 is arranged between the abutment 12 and the end of the sheet section 10, which is either configured section-wise corresponding to the width of the sheet sections or forms a surrounding ring. The reference numerals in FIG. 2 which are not mentioned separately have the same meaning as in FIG. 1.

It is obvious from FIG. 1 that in the area of the fixing points the retaining pin 4 serves as an abutment for the plastics element 11. Two externally surrounding recesses in the shape of a circular arc are designed at the retaining pin 4, which together with the plastics element 11 which is circular in cross-section take care that retaining pin 4 is secured in two defined positions against unintended axial displacement. In the final assembly position shown, the sheet section 10 acting as a leaf spring forces the plastics element into the recess of the retaining pin 4, which is disposed at the top side. If the retaining pin is pulled out axially for disassembling the airbag module, the plastics element 11 will be locked into place in the end recess of the retaining pin 4, which is disposed at the end side, so that it is secured in this position as well. If the retaining pin 4 is pulled out of the final assembly position, the plastics element 11 will be displaced slightly upwards with elastic deformation of the sheet section 10 until the retaining pin 4 has been pulled out to such an extent that it releases elongated hole 8. When all retaining pins 4 arranged such that they are distributed along the periphery have been pulled out to such an extent, the airbag module can be removed from the steering wheel. When the airbag module is inserted, the sheet sections 10 acting as leaf springs must be deformed elastically to such an extent that the retaining pins 4 can be pushed axially through the elongated holes 8 again. In the final assembly position shown, the sheet section 10 effects both the required pretension of the airbag module 6 against the horn actuation direction and the axial securing of the retaining pin via the intermediate plastics element 11. By using the design elements according to the invention, an airbag module can be attached, within the required short final assembly time, to an already installed steering wheel which is placed on the steering column as usual and is connected with the. steering column via a centrally attached nut. In this case, retaining pins 4 are held in a pulled-out position and only have to be pushed in after the airbag module is inserted.

What is claimed is:

1. A steering wheel comprising;
    a steering wheel skeleton (1) consisting of a hub, spokes and a steering wheel rim; and
    an airbag module (6) housed in said steering wheel skeleton and which for actuation of a horn is displaceable against a return force parallel to the steering wheel axis;
    at least two upwardly open fork-like support sites (2) having locating holes (3) extending approximately perpendicularly to the steering wheel axis being embodied in the steering wheel skeleton (1);
    downwardly angled mounting shackles (7) having elongated holes (8) extending in the direction of the steering wheel axis being embodied on or attached to a generator support (5) of the airbag module (6) in a way corresponding with the support sites (2);
    the airbag module (6) being joined to the steering wheel skeleton (1) by means of retaining pins (4) inserted in the locating holes (3) and through the elongated holes (8);
    sheet sections (10) acting as leaf springs arranged between the generator support (5) and the steering wheel skeleton (1), which when in the assembled state, support, at their end sides, on abutments (12) at the steering wheel skeleton (1) and pretension the airbag module (6) against displacement in the horn actuation direction;
    plastic elements (11) or a surrounding plastic ring being arranged between the sheet sections (10) and the abutments (12), and in the area of the fork-like support sites (2) the retaining pins (4) serve as an abutment for the plastic elements (11) and the plastic ring, respectively.

2. The steering wheel according to claim 1, characterized in that plastic bushes (9) are inserted in the elongated holes (8).

3. The steering wheel according to claim 1 characterized in that the retaining pins (4) are locked in place in the final assembly position by means of the plastic elements (11) and the plastic ring, respectively, and the sheet sections (10).

4. The steering wheel according to claim 1, characterized in that the plastic elements (11) and the plastic ring, respectively, are mounted on the sheet sections (10).

5. The steering wheel according to any claim 1, characterized in that the retaining pins (4) can be removed from the final assembly position with elastic deformation of the sheet sections (10).

* * * * *